Figure 1:
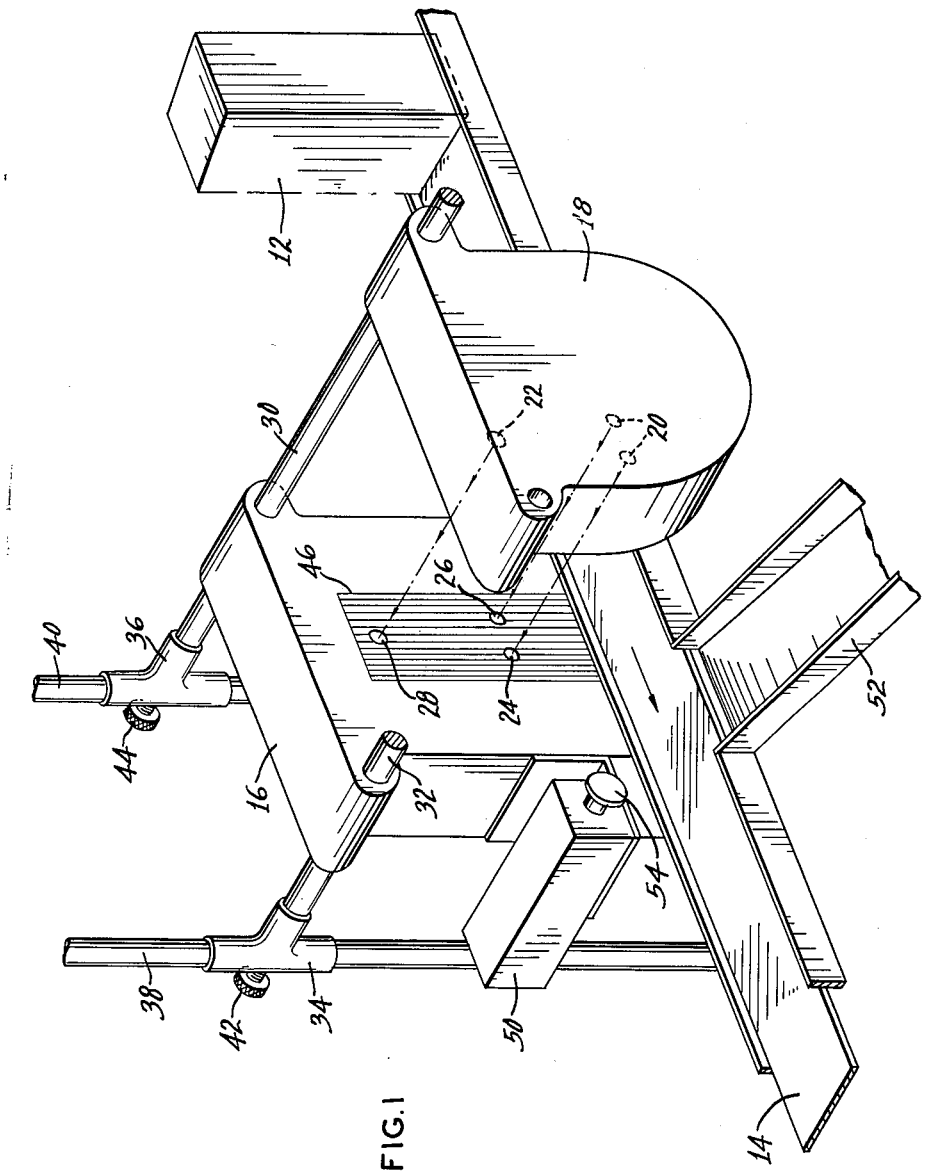

April 9, 1963  J. R. NILES  3,084,797
LEVEL DETECTOR

Filed April 7, 1959  2 Sheets-Sheet 1

INVENTOR.
JOHN R. NILES
BY Karl Haber
James E. Bryan
Alan C. Rose
ATTORNEYS

INVENTOR.
JOHN R. NILES

United States Patent Office 3,084,797
Patented Apr. 9, 1963

3,084,797
LEVEL DETECTOR
John R. Niles, St. Clair Shores, Mich., assignor to Nuclear Corporation of America, Inc., Denville, N.J., a corporation of Delaware
Filed Apr. 7, 1959, Ser. No. 804,675
7 Claims. (Cl. 209—82)

This invention relates to content and level detection arrangements, and more particularly to level detectors employing a plurality of diverse types of radiation.

In the packaging of milk, paint, corn flakes and the like, it is desirable to check to insure filling of the containers to the proper level. Previous arrangements for performing this check as containers move down a conveyor belt have included a microswitch to detect the location of the container, and an X-ray beam to sense the level within the container. Such arrangements have been subject to the disadvantage of false operation through the use of the mechanically operated switching contacts. Furthermore, the speed of operation of the system is severely restricted by the requirement of proper operation of the mechanical contacts. In addition, other level detectors employing photocells alone are limited in their application to transparent containers.

Accordingly, important objects of the present invention include improvement in the reliability, speed of operation and versatility of level and content detection systems.

In accordance with one illustrative embodiment of the invention, beams of light are applied to two spaced photocells, and a radiation detector such as a Geiger counter is located between the photocells to receive a radiation beam along a path generally parallel to the light beams. When a container interrupts the light beams, the intensity of received radiation indicates whether or not the contents of the container are up to the level of the radiation beam. Suitable bistable circuits which are responsive to the photocell and radiation detector output signals are also provided. In addition, an output rejection circuit is arranged to separate unfilled containers from the filled containers. Counter circuits which keep track of the total number of containers and the number of rejected containers are also provided.

In accordance with a feature of the invention, a system for determining the presence of contents in opaque packages includes a radiation detector mounted between a pair of photocells and arrangements for transmitting light and penetrating radiations along generally parallel paths toward the photocells and the radiation detector, respectively.

In accordance with another feature of the invention, a conveyor is provided for routing containers through the beams of light and radiations as set forth in the preceding paragraph, and rejection apparatus is provided for removing unfilled containers from the conveyor belt.

Figure 2:
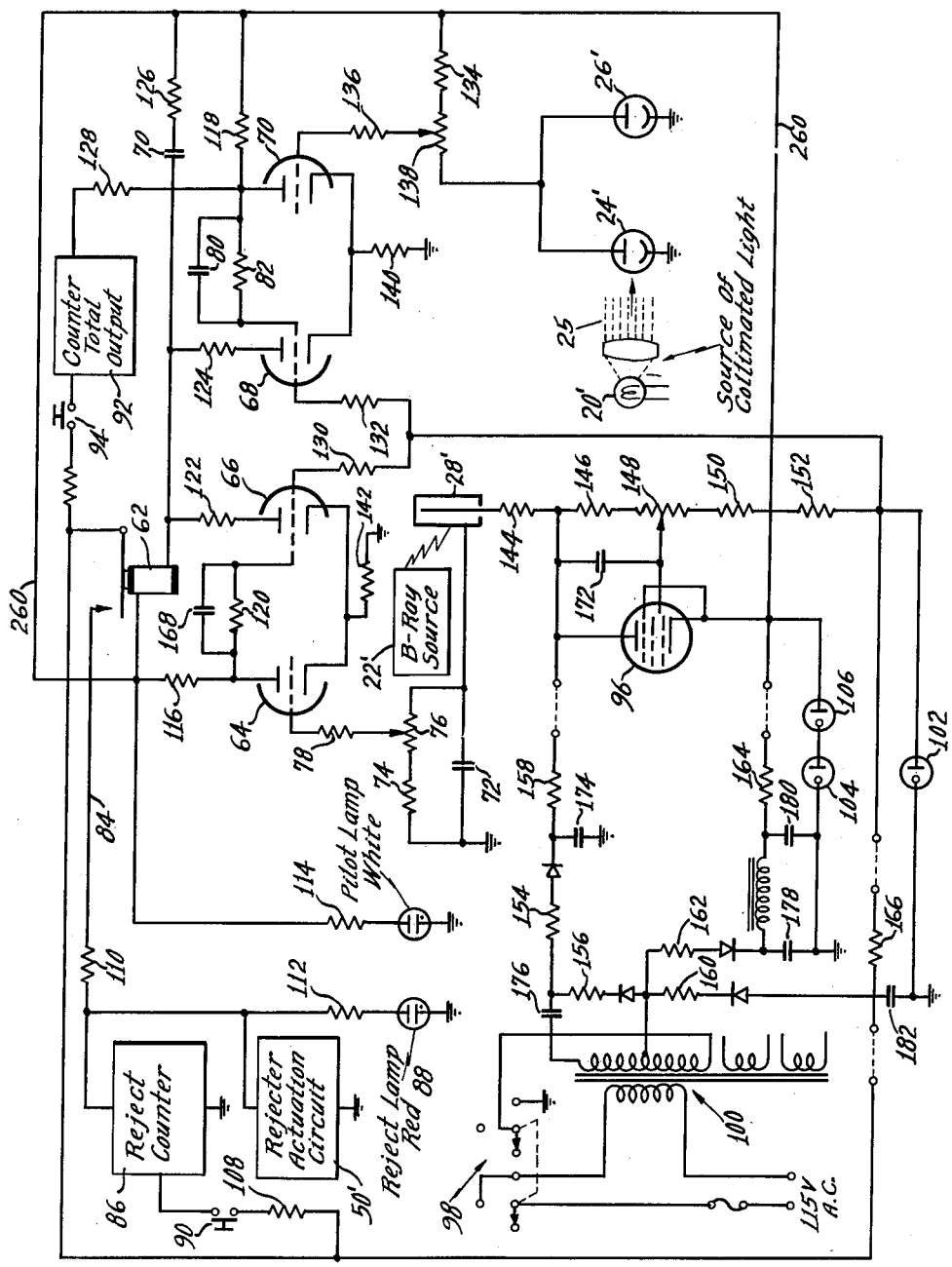

Other objects, features and various advantages of the invention will become apparent from a consideration of the following detailed description and from the drawings in which, FIGURE 1 is an isometric view of a physical embodiment of the present invention; and FIGURE 2 is a circuit diagram of the electric circuit employed in the implementation and operation of the apparatus shown in FIGURE 1.

With reference to FIGURE 1 of the drawings, a liquid filled opaque container 12 which may, for example, be a carton of milk is moved by the conveyor 14 along a path between the two heads 16 and 18 of a level detection apparatus. The level detection apparatus includes one or more sources of collimated light 20 mounted in the head 18. A source of penetrating nuclear radiations 22 is also mounted in the head 18 to direct a beam of radiations toward the head 16. Photocells 24 and 26 are mounted in the head 16 to receive illumination from the light source 20. A radiation detector 28 is also mounted in the head 16, on a vertical line between the twin photocells 24 and 26 and at a level close to the top of the milk containers on the conveyor 14.

The heads 16 and 18 are mounted on the supporting bars 30 and 32. The bar 32 is shown cut-away in the foreground to avoid obscuring the photocells 24 and 26. The height of the detection heads 16 and 18 may be adjusted through movement of the brackets 34 and 36 on the vertical suporting columns 38 and 40. Suitable set screw arrangements 42 and 44 facilitate retention of the detection assembly at the desired height. Supplemental screw type fine adjustments may also be provided.

As the milk cartons 12 are moved along by the conveyor 14, they pass through an inspection zone between the heads 16 and 18 and intercept the light and radiation beams. For convenience in analyzing the mode of operation of the apparatus, the projection of a milk carton in the inspection zone is shown by the shaded area 46 on the face of the detection head 16. In this regard, it may be noted that the photocells 24 and 26 are arranged to have the impinging light cut off by the passage of a milk carton. It may further be noted that the location of the radiation detector 28 is close to the top of the projection of the container on the head 16. Furthermore, the detector 28 is located on the perpendicular bisector of the line interconnecting the two photocells 24 and 26. The detector 28 is therefore located to receive radiation passing through the upper portion of the container 12 when it is in the inspection zone defined by the position of carton 12 when it blocks light rays transmitted to photocells 24 and 26.

The electrical control circuit, which will be described in detail below, enables the output of the radiation detector when light to both of the photocells 24 and 26 is intercepted by the container to permit rejection of unfilled containers as determined by radiation detector 28 and associated circuitry. By this arrangement, the level of received radiation produced by full and partially filled containers may be readily distinguished, as the output of the radiation detector is only enabled when the bulk of the contents of the container should be directly in the radiation beam. Note, for example, that if only one photocell were employed, the radiation detector might provide a false output signal if a corner of a filled opaque container intercepted the photocell light beam, thereby enabling the output of the radiation detector. This false indication of an empty container would result from the radiations passing through the thin corner of the container instead of impinging on the central portion of the contents of the container.

The apparatus of FIGURE 1 is also provided with a rejection mechanism 50 and a rejection chute 52 for receiving partially filled or empty containers. The rejection mechanism includes a plunger 54 which is actuated after a brief delay (as set forth below) in response to appropriate indications from the radiation detector 28. More specifically, upon the interruption of light at photocells 24 and 26, it will be assumed that a high level of radiation is received at detector 28. The high level of radiation provided by source 22 when an unfilled container is present will energize detector 28; the lower level of radiations resulting from attenuation by a filled container is insufficient to energize the detector 28. The interruption of light at both photocells 24 and 26 indicates that the carton 12 is centrally located with respect to the radiation detector 28. The high level of intensity received by detector 28 indicates that the container is insufficiently filled. Accordingly, after a delay sufficient for the container to move along conveyor 14 from a position in front of the detector 28 to a position in front of plunger 54, this plunger is actuated to deflect the container into the rejection chute 52. The rejector 50 may include a suitable hydraulically or electrically actuating mechanism for moving the plunger 54 at a relatively high speed to avoid interference with subsequent containers moving down the conveyor line. Damage to the container 12 may be avoided by the use of a broad resilient tip on the end of plunger 54.

FIGURE 2 is a circuit diagram for implementing the operation of the apparatus of FIGURE 1 as described above. In FIGURE 2, circuit components which directly correspond to elements shown in FIGURE 1 are designated by primed reference numerals corresponding to the numerals employed for the comparable elements in FIGURE 1. Thus, for example, the source of collimated light 20' corresponds to the light source or sources 20 included in the head 18 of FIGURE 1. Similarly, the photocells 24' and 26' as well as the Geiger counter tube 28' corresponds to the twin photocells 24 and 26, and the radiation detector 28, respectively, of FIGURE 1. The source of beta rays is designated 22 in FIGURE 1 and 22' in FIGURE 2. This beta ray source may, for example, be radioactive ruthenium 106 or strontium 90. In addition, other sources of penetrating radiations may be utilized. The rejector actuation circuit 50' of FIGURE 2 also corresponds generally to the rejector 50 as shown in FIGURE 1.

In addition to the components mentioned above, the key control elements of FIGURE 2 include the output relay 62, and two bistable circuits. The bistable circuits comprise a first Schmidt trigger circuit including the triodes 64 and 66, and a second Schmidt trigger circuit including the triodes 68 and 70. The bistable circuit including triodes 64 and 66 always has one tube conducting and one tube deenergized. The state of this circuit is dependent upon the intensity of the radiations received by the Geiger tube 28'. When the intensity is high, as when an empty container is present, triode 64 is energized and triode 66 is cut off; when the intensity is low, in the presence of a full container, however, the states of these tubes are reversed. It may be noted in passing that the coupling circuit including capacitor 72, and the three resistors 74, 76 and 78 essentially performs an integrating function so that the triode 64 is responsive to the level of radiation received by tube 28' rather than responding to individually received radiation pulses.

The other pair of triodes 68 and 70 forms a bistable trigger circuit which operates in substantially the same manner. The state of this trigger circuit is directly dependent upon the application of light from the source 20' to the photocells 24' and 26' in the grid circuit of triode 70. When either of the photocells 24' and 26' are receiving light, tube 70 is cut off and the other tube 68 of the trigger circuit is energized. When a container passes between the light source 25 and both of the photocells 24' and 26', however, the voltage at the grid to tube 70 rises, and this tube becomes energized. After a brief delay provided by condenser 80 and resistor 82, tube 68 is cut off. Relay 62 is normally energized and remains in this state whenever either tube 66 or tube 68 is energized. When both of these two tubes becomes de-energized, the back contacts will be closed. With this arrangement, it is clear that the relay 62 is de-energized only when both photocells 24' and 26' are off and when a high level of radiation is received on the Geiger counter 28'. Under these conditions, triodes 64 and 70 are energized, triodes 66 and 68 are de-energized, and no current is applied to the coil of relay 62.

When a series of empty or partially filled containers arrive in succession between the detection heads 16 and 18 of FIGURE 1, the mode of operation is as follows. Initially, prior to the arrival of the first container, the photocells are energized, tube 68 is conducting, and relay 62 is energized. With a high level of radiation present, the tube 64 is energized and remains energized. When the container blocks illumination from both of the photocells 24' and 26', tube 68 becomes de-energized, and relay 62 drops out. It may be noted in passing that a full container would reduce the radiation level and cause energization of tube 66 to retain the relay 62 in the energized state. The delay circuit 80, 82 provides time for energization of tube 66 prior to de-energization of tube 68 under these conditions. In addition, delay circuit including resistor 126 and capacitor 170 holds relay 62 in the energized state for a short time period following the de-energization of triode 68. As the first incompletely filled container passes the detection position, the photocells 24' and 26' are illuminated and the relay 62 is pulled in. Upon the arrival of the next incompletely filled container, the steps listed above are repeated. Accordingly, the passage of each incompletely filled container causes the energization and de-energization of relay 62 and produces an output signal on lead 84 to the rejector actuation circuit 50'. Upon the arrival of each such signal, the plunger 54 of FIGURE 1 is actuated to divert the incompletely filled containers into the rejection chute 52 of FIGURE 1.

In addition to energization of the circuit 50', signals from the output relay 62 are applied to the reject counter 86 and to the red reject lamp 88. The reject counter 86 is a standard commercially available counter. It may be reset by the closure of contacts 90. Another counter circuit designated 92 is energized by the actuation of the photocell trigger circuit including triodes 68 and 70. Counter 92 is also a commercially available counting device. Using the counters 86 and 92, the total number of containers passing down the assembly line may be readily compared with the number of rejects. The counter 92, like the counter 86, is provided with a reset circuit which includes the switch 94.

The foregoing completes the description of the fundamental portions of FIGURE 2. For completeness, the energization and the power supply circuits as well as the specific values of circuit components are set forth below. Initially, the Geiger counter 28' has a voltage of approximately 800 volts applied to it. This voltage is regulated by the shunt voltage regulator tube 96 and the associated resistance and capacitor network. It may also be adjusted by the variable resistance 148. The switching circuit 98 is provided for warm-up purposes to avoid damage to the electrolytic condensers and the Geiger tube. The switch 98 is also mechanically coupled to a shutter which blocks radiations from the radiation source when the system is turned off. The step-up transformer 100 provides the high voltage for the Geiger tube by means of a half wave rectification circuit and filtering arrangements which are generally conventional. The gas regulator tubes 102, 104 and 106 are employed in the development of plate voltage of the tubes 64, 66, 68 and 70 and also provide a reference voltage for regulator tube 96. Other circuit specifications, not specifically included above, are set forth below in tabular form:

Resistor 74 _____ 5 megohms.
Resistor 76 _____ 5 megohms.
Resistor 78 _____ 10 megohms.
Resistor 82 _____ 1 megohm.
Resistor 108 _____ 2,000 ohms.
Resistor 110 _____ 10,000 ohms.
Resistor 112 _____ 150,000 ohms.
Resistor 114 _____ 560,000 ohms.
Resistor 116 _____ 6,800 ohms.
Resistor 118 _____ 6,800 ohms.
Resistor 120 _____ 1 megohm.
Resistor 122 _____ 3,300 ohms.
Resistor 124 _____ 3,300 ohms.

| | |
|---|---|
| Resistor 126 | 3,300 ohms. |
| Resistor 128 | 100,000 ohms. |
| Resistor 130 | .56 megohm. |
| Resistor 132 | .56 megohm. |
| Resistor 134 | 5 megohms. |
| Resistor 136 | 10 megohms. |
| Variable resistor 138 | 5 megohms. |
| Resistor 140 | 2,700 ohms. |
| Resistor 142 | 2,700 ohms. |
| Resistor 144 | 1 megohm. |
| Resistor 146 | 43 megohms. |
| Variable resistor 148 | 5 megohms. |
| Resistor 150 | 27 megohms. |
| Resistor 152 | 4.7 megohms. |
| Resistor 154 | 100,000 ohms. |
| Resistor 156 | 100,000 ohms. |
| Resistor 158 | 10 megohms. |
| Resistor 160 | 1,200 ohms. |
| Resistor 162 | 100 ohms. |
| Resistor 164 | 3,000 ohms. |
| Resistor 166 | 30,000 ohms. |
| Capacitor 72 | .002 microfarad. |
| Capacitor 80 | 25 micro-microfarads. |
| Capacitor 168 | 25 micro-microfarads. |
| Capacitor 170 | .25 microfarad. |
| Capacitor 172 | .01 microfarad. |
| Capacitor 174 | .1 microfarad. |
| Capacitor 176 | .1 microfarad. |
| Capacitor 178 | 20 microfarads. |
| Capacitor 180 | 20 microfarads. |
| Capacitor 182 | 40 microfarads. |
| Coil 184 | 8 henries. |
| Tube 64, 66 | 12AT7. |
| Tube 68, 70 | 12AT7. |
| Tube 96 | 6BG6G. |
| Tube 102 | 0B2. |
| Tube 104 | 0B2. |
| Tube 106 | 0A2. |
| G.M. tube 100 | Anton No. 222. |
| Photocell 24' | Clairex C.L.-3 CdSe cell. |
| Photocell 26' | Clairex C.L.-3 CdSe cell. |
| Lamp 88 (red) | NE 51. |
| Pilot lamp 90 (white) | NE 51. |

It may also be noted that the transformer 100 is of a standard radio receiver type, and the rectifiers in the power supply may be selenium or silicon type rectifiers.

When the term "penetrating radiations" is employed in the present specification and claims, it refers to penetrating radiations such as X-rays or atomic radiations, in contrast to light. While beta rays from strontium 90 or ruthenium 106, for example, are preferred and are quite convenient to use, alpha or gamma radiations, or a neutron beam, could also be employed advantageously in some cases.

Regarding the location of the radiation detector 28 with reference to the photocells 24 and 26 in FIGURE 1, arrangements have been successfully employed for checking the level of the contents of milk cartons, condensed milk cans and beer cans. In the arrangement for milk cans, the cans are 2 15/16 inches in diameter and 3 15/16 inches high, a single collimated light source is directed toward two photocells located in separate tubes having an internal diameter of 1/4 inch and spaced 3/8 inch apart. A five millicurie strontium 90 beta radiation source is employed, and the aperture to the Geiger radiation detector is placed 1/2 inch behind an opening 1/2 inch in diameter in a 1/8 inch thick steel plate. The radiation detector aperture is located on a vertical line between the two photocells and one inch above the photocells. The height of the Geiger-Müller tube depends on the level of the contents of the can, with discrimination of at least 1/32 inch being obtained at speeds up to 1000 containers per hour.

It is to be understood that the above described arrangements are illustrative of the application of the principles of the invention. Numerous other arrangements may be devised by those skilled in the art without departing from the spirit and scope of the invention.

What is claimed is:

1. In combination, a pair of photocells, a radiation detector mounted between said photocells, means for transmitting light along a generally horizontal preassigned path toward said photocells, means for transmitting radiations along a path generally parallel to said preassigned path toward said detector, means for moving containers through said light and radiation paths, a first bistable circuit connected to change state upon the interruption of light to said photocells, a second bistable circuit connected to change state upon the interruption of radiations to said detector, an output circuit connected to receive signals by said two bistable circuits, rejection apparatus, and means responsive to the energization of said output circuit for operating said rejection apparatus to separate unfilled containers from filled containers.

2. In combination, a pair of photocells, a radiation detector mounted between said photocells, means for transmitting light along a preassigned path toward said photocells, means for transmitting radiations along a path generally parallel to said preassigned path toward said detector, mens for moving containers through said light and radiation paths, a first bistable circuit connected to change state upon the interruption of light to said photocells, a second bistable circuit connected to change state upon the significant reduction of radiations to said detector, an output circuit connected for energization by said two bistable circuits, a first counter coupled to said first bistable circuit, and a second counter coupled to said output circuit, whereby the number of unfilled containers may be directly compared with the total number of containers examined.

3. In a level detector system for opaque containers, means for moving containers to be inspected successively through an inspection zone, means for directing rays of light through two laterally spaced points blocked by each of said containers when it occupies said zone, and means for directing a ray of atomic radiations through the upper portion of each of said containers as it passes through said inspection zone, an output circuit, a first bistable circuit, means for changing the state of said bistable circuit when said rays of light through the two spaced points are interrupted, a second bistable circuit, means for changing the state of said second bistable circuit when said ray of atomic radiations is interrupted, and means for controlling the state of said output circuit in accordance with the states of both of said two bistable circuits.

4. Apparatus for determining the level to which containers are filled including in combination means for moving containers in an upright position along a predetermined path, first and second radiation detectors, means mounting said first and second radiation detectors adjacent said path with a spacing in the direction of said path which is less than the width of a container, means for directing radiation across said path to said first and second detectors, a third radiation detector, means mounting said third radiation detector adjacent said path between said first and second detectors at a height corresponding to the level to which said containers should be filled, a source for directing energy across said path to said third radiation detector, normally disabled means adapted to be enabled to produce an indication of a container which is not filled to said level in response to energization of said third detector by energy from said source, means responsive to the interruption of radiation from said radiation directing means to said first and second detectors for enabling said indicating means, means responsive to said indication producing means for counting the number of unfilled containers and means responsive to the interruption of radiation from said first radiation directing means to said first and second detectors for counting the total number of containers passing through said apparatus.

5. Apparatus for determining the level to which containers having a rectangular cross section are filled including in combination means for moving said containers in an upright position along a predetermined path, first and second radiation detectors, means mounting said first and second radiation detectors adjacent said path with a spacing in the direction of said path which is less than the width of a container, means for directing radiation across said path to said first and second detectors, a third radiation detector, means mounting said third radiation detector adjacent said path between said first and second detectors at a height above said first and second detectors corresponding to the level to which said containers should be filled, a source for directing energy across said path to said third radiation detector, normally disabled means adapted to be enabled to produce an indication of a container which is not filled to said level in response to energization of said third detector by energy from said source and means responsive to the interruption of radiation from said radiation directing means to said first and second detectors for enabling said indicating means.

6. Apparatus for determining the level to which containers having a rectangular cross section are filled including in combination means for moving said containers in an upright position along a predetermined path, first and second radiation detectors, means mounting said first and second radiation detectors adjacent said path with a spacing in the direction of said path which is less than the width of a container, means for directing radiation across said path to said first and second detectors, a third radiation detector, means mounting said third radiation detector adjacent said path between said first and second detectors at a height above said first and second detectors corresponding to the level to which said containers should be filled, a source for directing energy across said path to said third radiation detector, normally disabled means adapted to be enabled to produce a signal in response to energization of said third detector by energy from said source, means responsive to the interruption of radiation from said radiation directing means to said first and second detectors for enabling said signal producing means and means responsive to said signal for moving a container which is not filled to said level out of its normal path of movement.

7. Apparatus for determining the level to which containers having a rectangular cross section are filled including in combination means for moving said containers in an upright position along a predetermined path, a pair of photo-electric detectors, means mounting said photo-electric detectors adjacent said path with a spacing in the direction of said path which is less than the width of a container, means for directing light across said path to the respective photo-electric detectors, an ionizing radiation detector, means mounting said ionizing radiation detector adjacent said path between said photo-electric detectors at a height above said photo-electric detectors corresponding to the level to which said containers are to be filled, means for directing ionizing radiations across said path to said ionizing radiation detectors, normally disabled means adapted to be enabled to produce an indication of a container which is not filled to said level in response to energization of said ionizing radiation detector by energy from said ionizing radiation directing means and means responsive to the interruption of light from said light directing means to said photo-electric detectors for enabling said indicating means.

References Cited in the file of this patent
UNITED STATES PATENTS

| | | |
|---|---|---|
| 2,742,150 | Rendel | Apr. 17, 1956 |
| 2,788,896 | Coleman | Apr. 16, 1957 |
| 2,861,190 | Molins et al. | Nov. 18, 1958 |
| 2,885,557 | Kizaur | May 5, 1959 |

FOREIGN PATENTS

| | | |
|---|---|---|
| 699,129 | Great Britain | Oct. 28, 1953 |